Aug. 16, 1966   J. E. ADAMS   3,266,139

METHOD OF ASSEMBLING VEHICLE BODY MOUNT PARTS

Filed Feb. 4, 1963

INVENTOR.
JAMES E. ADAMS
BY
Malcolm W. Fraser
ATTORNEY

United States Patent Office 3,266,139
Patented August 16, 1966

3,266,139
METHOD OF ASSEMBLING VEHICLE BODY MOUNT PARTS
James E. Adams, Toledo, Ohio, assignor, by mesne assignments, to The Bishop and Babcock Corporation, Toledo, Ohio, a corporation of Ohio
Filed Feb. 4, 1963, Ser. No. 255,809
4 Claims. (Cl. 29—509)

This invention relates to a method of assembling fastening devices for securing a motor vehicle body panel to the chassis frame and embodying resilient spacers providing cushioning means between the parts and affording sound insulation against frame vibrations and noise.

An object is to improve and simplify the assembly of the body mount parts to the frame of the vehicle so that by virtually a single operation involving a continuous movement of the operating plunger, the rubber blocks are compressed to the proper degree and a staking step is effected to fasten the parts securely in a reliable manner, such as to overcome difficulties, objections and uncertainties inherent in previous assembly operations.

Another object is to perform a staking operation in such manner as to insure that the stakes are forced outwardly so that not only is an efficient securing step performed but also the inside of the tube from which the stakes are struck is free and clear.

A further object is to improve the staking of body mount parts in such manner that smaller stakes can be satisfactorily used with the result that a stronger tube is provided and further that the necessity of close tolerances is eliminated, thereby greatly simplifying the assembly operation and materially reducing, if not completely eliminating, improperly connected parts.

Other objects and advantages of the invention will hereafter appear and, for purposes of illustration, but not limitation, an embodiment of the invention is shown on the accompanying drawings in which.

Figures 1, 2, 3, 4, 5:
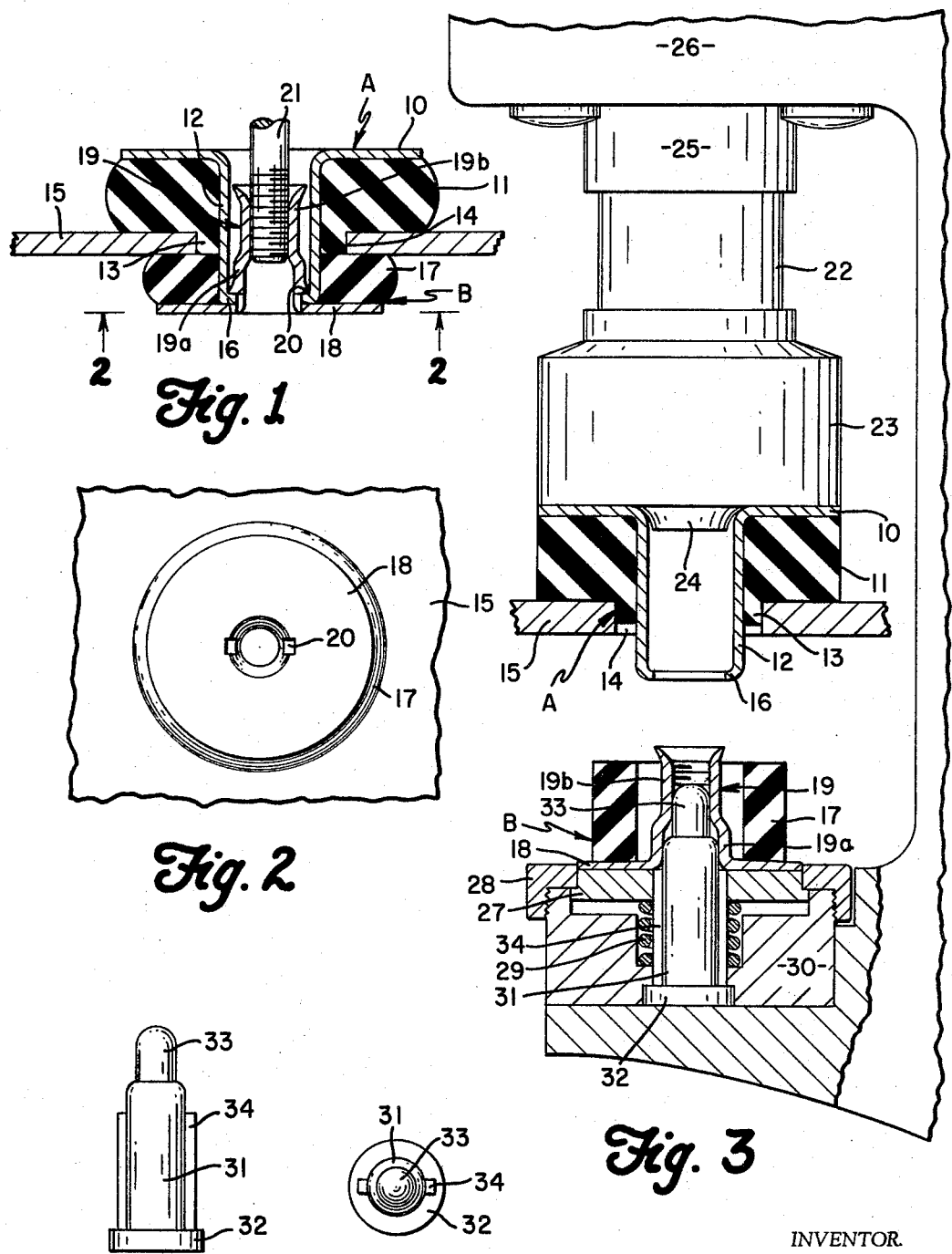
FIGURE 1 is a vertical, sectional view showing the body mount in assembled condition and mounted on a frame member of a motor vehicle.
FIGURE 2 is a bottom plan view of the assembly shown on FIGURE 1.
FIGURE 3 is a side elevation partly in section of the tool for assembling the parts of the body mount on the frame member.
FIGURE 4 is a side elevation of the staking punch forming a part of the tool for assembling the body mount parts.
FIGURE 5 is a top end view of the staking punch shown on FIGURE 4.

The illustrated embodiment of the invention comprises a body mount fastener for motor vehicles consisting essentially of sheet metal parts A and B. The part A consists of a flat sheet metal disc-like head 10 which abuts flatly against a relatively thick rubber insulator or spacer 11. Integral with the head 10 depends a centrally disposed integral elongate sleeve 12. The rubber insulator 11 also abuts against the outside surface of the sleeve 12 and is formed with an axial reduced extension 13 of a size snugly to fit an aperture 14 in a motor vehicle frame part 15. The sleeve 12 extends substantially beyond the axial extension 13 and is formed at its outer end with an inwardly extending cylindrical lip 16.

Disposed on the opposite side of the motor vehicle frame part 15 and abutting thereagainst as well as against the lower end of the extension 13 of the rubber insulator 11 is a rubber insulator 17, which is of considerably less thickness than that of the insulator 11, (in this instance about one-half the thickness of the insulator 11). Each of the insulators 11 and 17 is of resilient rubber so that it can be substantially compressed to a degree such as indicated on FIGURE 1.

The outer flat end of the insulator 17 is engaged by a flat disc-like sheet metal head 18 which is formed with a centrally disposed integral upwardly extending sleeve 19 having a relatively large diameter lower section 19a and an upper section 19b of substantially less diameter than that of the section 19a. The upper section 19b is formed with internal screw threads and the free outer end is flared outwardly.

As will hereafter be more fully described, the heads 10 and 18 are placed under compression in order to compress the rubber insulators 11 and 17 and thereupon diametrically opposed stakes or flanges 20 are formed in the lower section 19a of the sleeve 19, these stakes or flanges extending outwardly and overlying the inside of the lip 16, thus securing the parts A and B together with the rubber insulators maintained under compression. It should be understood that on top of the head 10 of the sheet metal part A rests the body panel of the motor vehicle (not shown) and extending through such panel is a screw, such as indicated at 21, which threadedly engages the section 19b of the sleeve 19, thereby to retain the body of the vehicle to its frame. It will be understood that several of these body mounts are required for each motor vehicle in order properly to secure the body to the frame.

This invention is concerned particularly with the method of assembling the body mount parts A and B and particularly to the step of staking the parts together, i.e. the formation of the stakes or flanges 20 which positively secure together the sheet metal parts and retain the rubber insulators under compression.

Referring to FIGURES 3 to 5, 22 represents a hydraulically operated piston rod or shaft which is formed with an enlarged head 23 having at its lower end a centrally disposed centering nose 24 having curved sides in order to extend into and fit the upper end of the sleeve 12, the bottom of the head being flat to abut flatly against the head 10. The piston rod 22 is slideable in a cylinder 25 which is carried by a C-frame or support 26. In opposed relation to the piston head 23 is a platform 27 on which rests the head 18 of the sheet metal part B. The platform 27 is urged upwardly against a stop ring 28 by a coil spring 26. The stop ring 28 screw threadedly engages a mounting block 30 carried by the C-frame 26, it being noted that the platform has a limited amount of movement between the ring 28 and the cavity in the block 30. Carried by the block 30 and projecting upwardly through the platform 27 and therebeyond is a staking punch 31 which has an enlarged base 32 at the bottom end retained in the block 30. The punch is cylindrical in shape and has at its upper end a nose 33 of reduced diameter, the shoulder between the nose 33 and the body of the punch being outwardly and downwardly curved, thereby substantially to fit the upper end of the lower section 19a of the sleeve 19. Carried by the body of the punch is a staking implement 34 which may be of one piece and is inserted transversely through a slot in the punch 31 so that it projects equidistantly on opposite sides of the punch, substantially as shown on FIGURE 4. The bottom end of the staking implement 34 rests against the base 32 and the upper end is disposed a substantial distance below the upper end of the punch.

In the assembly operation the part B of the body mount is applied to the platform 27, as indicated on FIGURE 3 with the lower portion of the C-frame 26 arranged beneath the apertured frame 15. The rubber sleeve or insulator 17 rests on the head 18 which in turn is placed on the platform 27. Note that the head 18 fits the platform at its upper face and within the opening of the stop ring 28. The sleeve or insulator of the part A is applied to the aperture 14 of the frame 15 so that the extension 13 fits into the aperture. The staking gun is applied so that the operating head 23 is engaged with the head 10 and so that the centering nose 24 extends slightly into the sleeve 12. Thereupon the tool is actuated causing the sleeve 19 to move into the sleeve 12, compressing the insulators 17 and 11. Such movement continues until the lip 16 is engaged by the head 18, and by this time the nose 33 of the staking punch has entered the reduced upper section 19b of the sleeve 19 a short distance. Further movement of the piston 22 operates to depress the platform 27 against the force of the coil spring 29 enabling the staking implement 34 to fracture the metal in the lower portion of the lower section 19a of the sleeve 19 and cause the metal to flow outwardly over the cylindrical lip 16 of the sleeve 12, thereby effectively stake the two parts together with the rubber insulators 11 and 17 held under compression. Thereafter the hydraulic piston rod 22 retracts and the tool can be removed from the body mount. A screw 21 can be applied to secure the vehicle body panel to the frame 15 as will be readily understood.

From the above description it will be understood that a pair of diametrically opposed stakes 20 are formed in such a manner as efficiently and effectively to retain the parts together. Since the body 31 of the punch has a relatively close fit with the inside of the lower section 19a of the sleeve 19 no possibility exists of the stakes inadvertently extending inwardly. It is necessary that the stakes move outwardly to effect the desired securing engagement with the cylindrical lip 16. In this instance it is possible to employ smaller stakes 20 than heretofore because of the positive action of securement. By the use of smaller stakes the tube 19 is stronger than has been the case where larger stakes have been required. Another feature of advantage is that the securement of the body mount parts A and B is effected by a single continuous operation which could not be achieved by methods previously employed. Another feature of importance is that by virtue of the above assembly operation close tolerances are eliminated, which heretofore have been necessary. It is found with the above method that tapping of the sleeve 19 can at all times be accomplished without interference of the stakes and additionally the tap can be extended entirely through the tube 19. This makes possible the use of a lead style tap instead of the bottom style tap, which has been necessary with previous assembly methods.

Numerous changes may be effected without departing from the spirit of the invention, especially as defined in the appended claims.

What I claim is:
1. The method of assembling a pair of body mount parts on an apertured vehicle frame part in which one part includes a disc-like head having a first depending sleeve provided with an inturned lip at the lower end for insertion through the frame aperture and in which the other part includes a disc-like head having a second upstanding sleeve of a size to fit inside said first sleeve, there being cylindrical rubber blocks disposed between said heads and the frame part respectively, the step which comprises pressing the body mount parts toward each other compressing the rubber blocks and extending said second sleeve into said first sleeve, and concomitantly causing a staking punch to move into said second sleeve with a sliding fit, said punch having a staking implement movable with the punch and operative after a predetermined movement of the latter to fracture the metal at the lower end of said second sleeve and cause same to move laterally outward to lie over and in intimate contact with said inturned lip.

2. The method as claimed in claim 1 in which the staking implement simultaneously fractures a pair of diametrically opposed portions of the second sleeve.

3. The method as claimed in claim 1 in which the staking punch fits the inside of the second sleeve to insure that the stakes do not project inside of such sleeve.

4. The method as claimed in claim 1 in which the compression of the rubber blocks and the staking take place successively but during a substantially continuous motion forcing the body mount parts toward each other.

References Cited by the Examiner
UNITED STATES PATENTS

| | | | |
|---|---|---|---|
| 2,976,080 | 3/1961 | Moore | 248—358 X |
| 3,084,963 | 4/1963 | Beehler | 287—85 X |
| 3,091,842 | 6/1963 | Creamer | 29—522 X |
| 3,193,237 | 7/1965 | Adams | 248—358 |

CHARLIE T. MOON, *Primary Examiner.*